United States Patent [19]

Phillips

[11] Patent Number: 4,850,229

[45] Date of Patent: Jul. 25, 1989

[54] BALLISTICS PRESSURE TRANSDUCER

[75] Inventor: Welton E. Phillips, Yuma, Ariz.

[73] Assignee: The United States of America as represented by The Secretary of The Army, Washington, D.C.

[21] Appl. No.: 229,516

[22] Filed: Aug. 5, 1988

[51] Int. Cl.$^4$ .................... G01L 23/10; G01L 5/14
[52] U.S. Cl. .......................... 73/756; 73/167; 73/706; 73/714; 73/754
[58] Field of Search ................ 73/706, 714, 754, 756, 73/167, 866.5

[56] References Cited

U.S. PATENT DOCUMENTS

| | | | |
|---|---|---|---|
| 3,886,792 | 6/1975 | Change et al. | 73/167 |
| 4,519,254 | 5/1985 | Sonderegger et al. | 73/756 |
| 4,621,519 | 11/1986 | Phillips | 73/35 |
| 4,735,091 | 4/1988 | Engeler et al. | 73/756 |

Primary Examiner—Stewart J. Levy
Assistant Examiner—Michele Simons
Attorney, Agent, or Firm—Saul Elbaum; W. Robert Baylor; Guy M. Miller

[57] ABSTRACT

The invention involves the design of a miniaturized piezoelectric pressure transducer used for measuring pressure-time characteristics in gun tubes during the propellant ignition and burning process. The transducer utilizes a Z-cut tourmaline crystal as the piezoelectric pressure sensing element which produces a finite amount of electrical charge (normally expressed in picocoulombs) for a given change in pressure. The tourmaline crystal is incapsulated in a mechanical fixture which provides means for mounting in the gun tube. Electrical terminals are provided for connnecting to signal conditioning and recording instrumentation. Insulators are provided for electrically insulating the pressure sensing element from weapon ground.

3 Claims, 6 Drawing Sheets

BALLISTICS PRESSURE TRANSDUCER

RIGHTS OF THE GOVERNMENT

The invention described herein may be manufactured, used and licensed by or for the U.S. Government for Governmental purposes without payment to me of any royalty thereon.

BACKGROUND OF THE INVENTION

1. Field of the Invention

The present invention relates a ballistics pressure transducer and more particularly, is directed to a miniaturized piezoelectric pressure transducer used for measuring pressure characteristics in gun weapon tubes during the propellant ignition and burning process of ordnance projectiles.

2. Description of the Prior Art

My U.S. Pat. No. 4,621,519 relates to the model T8 ballistics pressure transducer and is briefly described in the present invention. Although the patented model T8 pressure transducer design has proven to be very reliable in a wide variety of applications, recent development in the higher performance ammunition components and propellants have made it necessary to severely restrict the size of the pressure ports that can be drilled in a gun tube in order to minimize stress concentrations. The recent requirement for measuring chamber pressures in gun tubes with concentric recoil systems has also limited the size of pressure transducers because no part of the transducer can extend beyond the outside surface of the gun tube. There is a limit to which the mode T8 design can be miniaturized and still maintain the required structural integrity; therefore a new design had to be developed.

Prior to the present invention, the best pressure transducer available for chamber pressure-time measurements in the higher performance weapon systems was the Kistler model 6211 miniaturized quartz transducer. The present disclosure describes the Kistler model 6211 and compares it with the two embodiments; namely, the models E30M and E30MA.

In the comparison tests, there has been noted some significant design problems which adversely affects the quality and accuracy of the pressure data. Some of the more significant design problems include:

a. The quartz pressure sensing element is not electrically insulated from ground which can allow stray electrical signals to be superimposed on the pressure data and be interpreted as pressure pulses. This design also makes it very difficult to eliminate electrical noise caused by ground loops. The pressure sensing element in the present invention is electrically insulated from ground.

b. The output sensitivity is approximately one third that of the E30M and E30MA models described in the present invention which results in a considerably lower signal-to-noise ratio.

c. The amount of torque applied in mounting the model 6211 transducer is very critical. The output sensitivity can change by several percent if an excessive amount of torque is applied. It also requires retorqueing after every few rounds which can cause significant test delays if the gun tube has to be removed from its mount to gain access to the transducer. The present invention is not torque sensitive.

d. The maximum pressure limit on the model 6211 transducer is approximately 105K psi and there are already measurement requirements in the field exceeding this limit. The present invention has been tested up to approximately 125K psi. The maximum pressure limit has not been determined.

OBJECTS OF THE INVENTION

It is therefore an object of the invention to provide a miniaturized piezoelectric pressure transducer for measuring higher performance pressure characteristics in gun tubes during the propellant ignition and burning process of ordnance projectiles.

It is a further object of the invention to provide a miniaturized piezoelectric pressure transducer for acquiring more accurate and reliable transient pressure measurements in gun tubes up to 120K psi.

It is a further object of the invention to provide a miniaturized piezoelectric pressure transducer that constitutes a simple and compact device having a transducer body, a pressure sensing element and a coaxial connector assembly.

The foregoing and other objects in accordance with the present invention are attained through the use of a Z-cut tourmaline crystal as the piezoelectric pressure sensing element which produces a finite amount of electrical charge for a given change in pressure. The tourmaline crystal is incapsulated in a mechanical fixture which provides means for mounting in the gun tube. Electrical terminals are provided for connecting and recording instrumentations. Insulators are provided for electrically insulating the pressure sensing element from the gun weapon ground.

SUMMARY OF THE INVENTION

A piezoelectric pressure transducer designed for acquiring more accurate and reliable transient pressure measurements in gun tubes up to 120K psi. The transducer is comprised of three basic components: transducer body, pressure sensing element and coaxial connector assembly. The pressure sensing element utilizes a tourmaline piezoelectric crystal disc with positive and negative charge collectors attached to the active faces. The charge collectors are attached to the coaxial connector assembly through insulated electrical wire. The pressure sensing element is attached to the transducer body by insulating epoxy and a retainer cap which also serves as a thermal barrier and the element is also electrically insulated from the transducer body by the insulating epoxy and an insulating washer. The coaxial connector assembly is also electrically insulated from the transducer body by an insulating sleeve. The transducer body features a threaded portion and pressure seal surface for mounting in the gun weapon.

DETAILED DESCRIPTION OF PREFERRED EMBODIMENTS

Figure 1:
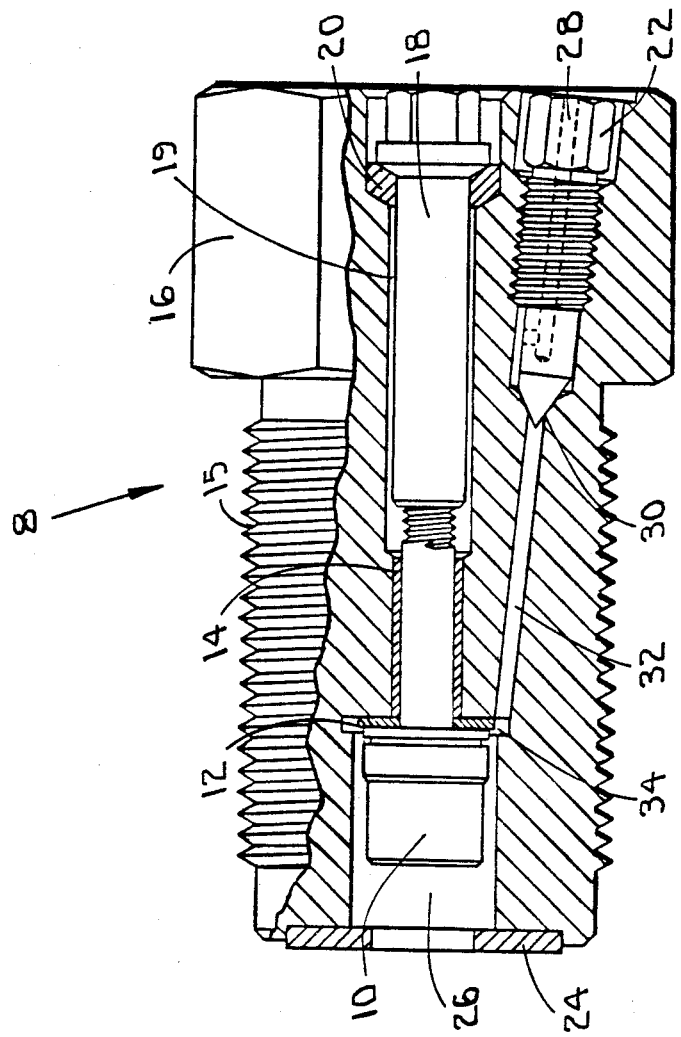
FIG. 1 is a cutaway view of the ballistics pressure transducer described in U.S. Pat. No. 4,621,519.

Referring to FIG. 1 there is shown a prior art ballistics pressure transducer, generally identified as model T8 . This transducer is described in my U.S. Pat. No. 4,621,519. Model T8 has a transducer body 8 that is comprised of a head 16 and a screw thread 15. Mounted within the central bore 19 of transducer body 8 is element retainer 18 which is separated from transducer body 8 by means of insulating ring 20. Attached to one end of element retainer 18 is pressure sensing element 10, which extends through central bore 19 and into pressure chamber 26 of transducer body 8. Pressure sensing element 10 is separated from transducer body 8 by means of insulating washer 12 and insulating sleeve 14. Insulating washer 12, insulating sleeve 14, and insulating ring 20 all act to electrically insulate pressure sensing element 10 and element retainer 18 from transducer body 8. Pressure chamber 26 is partially sealed by pressure seal 24, which comprises a metal washer and which is used to prevent gas leakage.

As pointed out in the patented model T8 , during use, pressure chamber 26 is filled with a high temperature grease which is adjusted through needle valve 22 with a standard grease gun, not shown, which is equipped with a socket driven attachment to open and close the needle valve. When needle 22, which is screwed into head 16 of transducer body 8, is opened, grease can travel through the center hole 28 of the needle valve 22, around the valve seat 30, and down the access hole 32. The grease then fills recessed cavity 34 and flows into pressure chamber 26. The recessed cavity 34 allows the grease to completely surround the pressure sensing element 10 before proceeding into the pressure chamber 26, which provides a more uniform flushing action and reduces air pockets.

Figure 2:
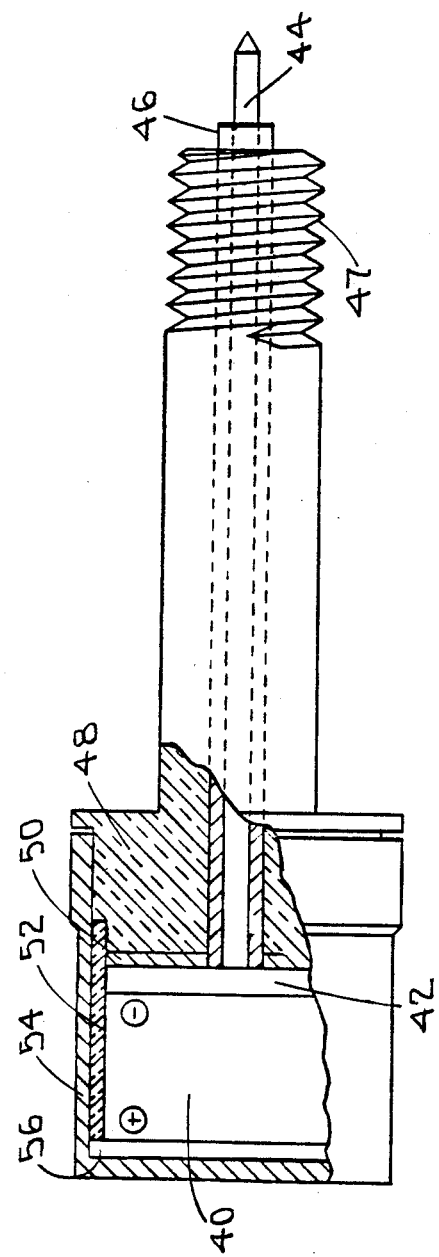
FIG. 2 is a cutaway view of the pressure sensing element in the patented ballistics pressure transducer.

Further, U.S. Pat. No. 4,621,519 describes the uses of a single and a double crystal configuration for the presure sensing element. FIG. 2 shows the pressure sensing element with the single crystal configuration. Tourmaline crystal disc 40 is mounted within ground cap 54, between positive charge collector 56 and negative charge collector 42. The charge collectors 42 and 56 are metal discs attached to the positive and negative faces of crystal 40 by means of conductive epoxy. The charge generated at the positive face of crystal 40 is transmitted through ground cap 54 and crystal base 48 which terminates in a standard electrical coaxial connector. The coaxial connector comprises screw thread 47 and center conductor 44. The charge generated at the negative face of the crystal 40 is transmitted through center conductor 44 which is soldered to the center of the negative charge collector 42. The positive and negative terminals of the pressure sensing element are electrically insulated from each other by the crystal insulator 52, insulating washer 50, and insulating sleeve 46. The patented pressure sensing element is also described with the double crystal configuration.

Figure 3:
FIGS. 3a and 3b illustrate external views of a prior art ballistics pressure transducer and one embodiment of the present invention; both are drawn to twice the actual sizes to the disclosed ruler in FIG. 3.
Figure 3A:
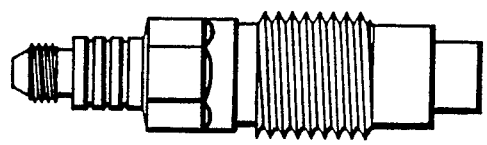
Figure 3B:
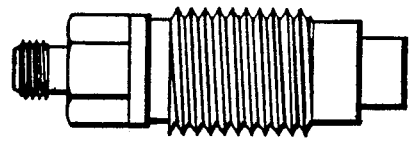

FIG. 3a shows a prior art device which is identified in the art as Kistler model 6211 ballistics pressure transducer. Below the Kistler model in FIG. 3b there is shown an embodiment of the present invention, which is identified in the art as YPG model E30MA. "YPG" stands for U.S. Army Yuma Proving Ground. Both the Kistler model and the YPG model E30MA are shown at twice the actual inch measurement scale of FIG. 3 ruler.

Figure 4:
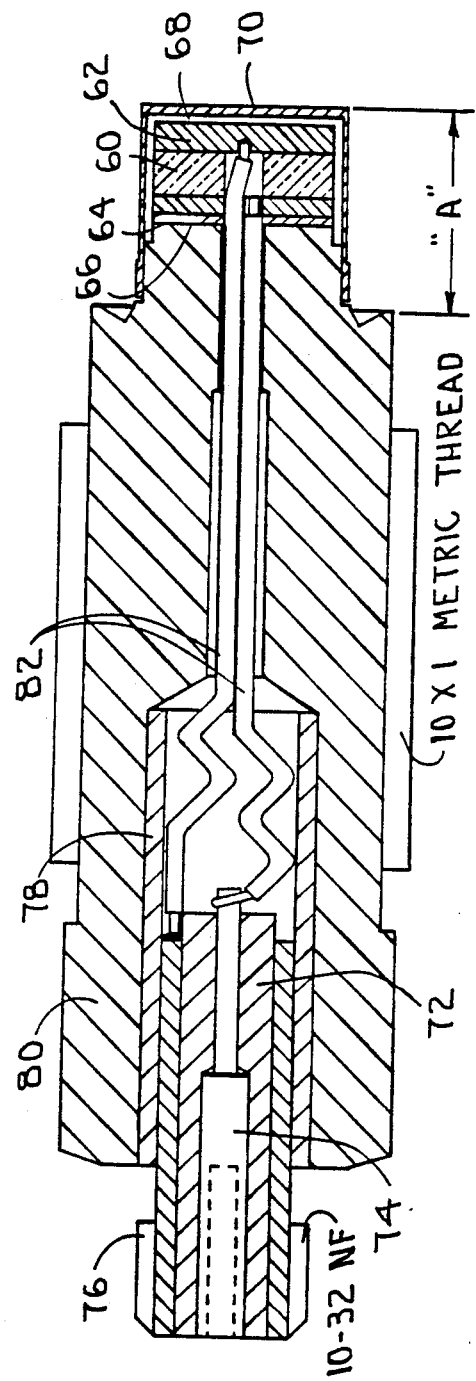
FIG. 4 is a cutaway view of another embodiment of the invention.

In the embodiment of FIG. 4, which is identified as model E30 in the art there are disclosed 12 components: namely , a Z-cut tourmaline crystal 60, positive charge collector 62, negative charge collector 64, insulating washer 66, insulating epoxy 68, retainer cap 70, inner insulating sleeve 72, center conductor 74, shield stud 76, outer insulating sleeve 78, transducer body 80, and insulated conductors 82. The charge collectors 62, 64 are metal discs attached to the positive and negative faces of the crystal 60 with a conductive epoxy. The transducer body 80 utilizes the Z-cut tourmaline crystal 60 as the piezoelectric pressure sensing element which produces a finite amount of electrical charge (normally expressed in picocoulombs) for a given change in pressure. The charge generated by the crystal 60 during pressurization is transmitted to the center conductor 74 and shield stud 76 through the insulated were conductors 82. The shield stud 76, center conductor 74, and inner insulating sleeve 72 form a standard electrical coaxial connector having a 10–32 NF thread. The crystal-charge collector assembly is electrically insulated from the transducer body 80 by the insulating washer 66 and insulating epoxy 68. The coaxial connector assembly is electrically insulated from the transducer body 80 by the outer insulating sleeve 78. The retainer cap 70 holds the crystal-charge collector assembly in place and protects the assembly from abrasion and thermal transients.

In addition to having greater versatility in regard to miniaturization and mounting configurations, the model E30M has another advantage over the patented model T8 pressure transducer design and is also structurally different therefrom. In FIG. 2 there is shown the pressure sensing element in the model T8 transducer. The ground cap 54 on the model T8 pressure sensing element is part of the charge conducting circuit and is in direct contact with the positive charge collector 56. FIG. 4 shows the embodiment of the present invention which is identified in the art as model E30M. The retainer cap 70, formerly the ground cap, on the model E30M transducer, is not part of the charge conducting circuit. In the model E30M, a layer of insulating epoxy 68 has been placed between the retainer cap 70 and the positive charge collector 62 which acts as an additional thermal barrier.

Figure 5:
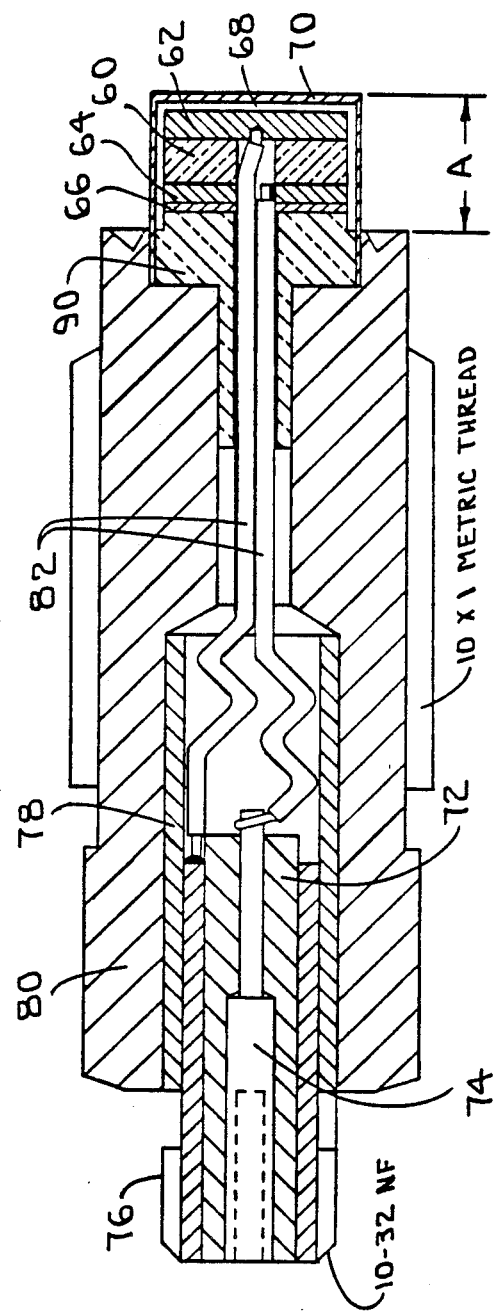
FIG. 5 is a cutaway view of the FIG. 3f pressure transducer embodiment.

In FIG. 5 there is shown another embodiment of the present invention which is identified in the art as model E30MA which is comprised of 13 components. This model is identical to the E30M embodiment except that a crystal base 90 has been added which makes the crystal-charge assembly a readily detachable insert. This simplifies the rebuild procedure of the transducer and reduces the distance between the pressure seal surface and the face of the retainer cap (dimension "A") which allows the transducer to be mounted in thinner walled gun tubes. Epoxy is used to attach the insert to the transducer body.

Figure 6:
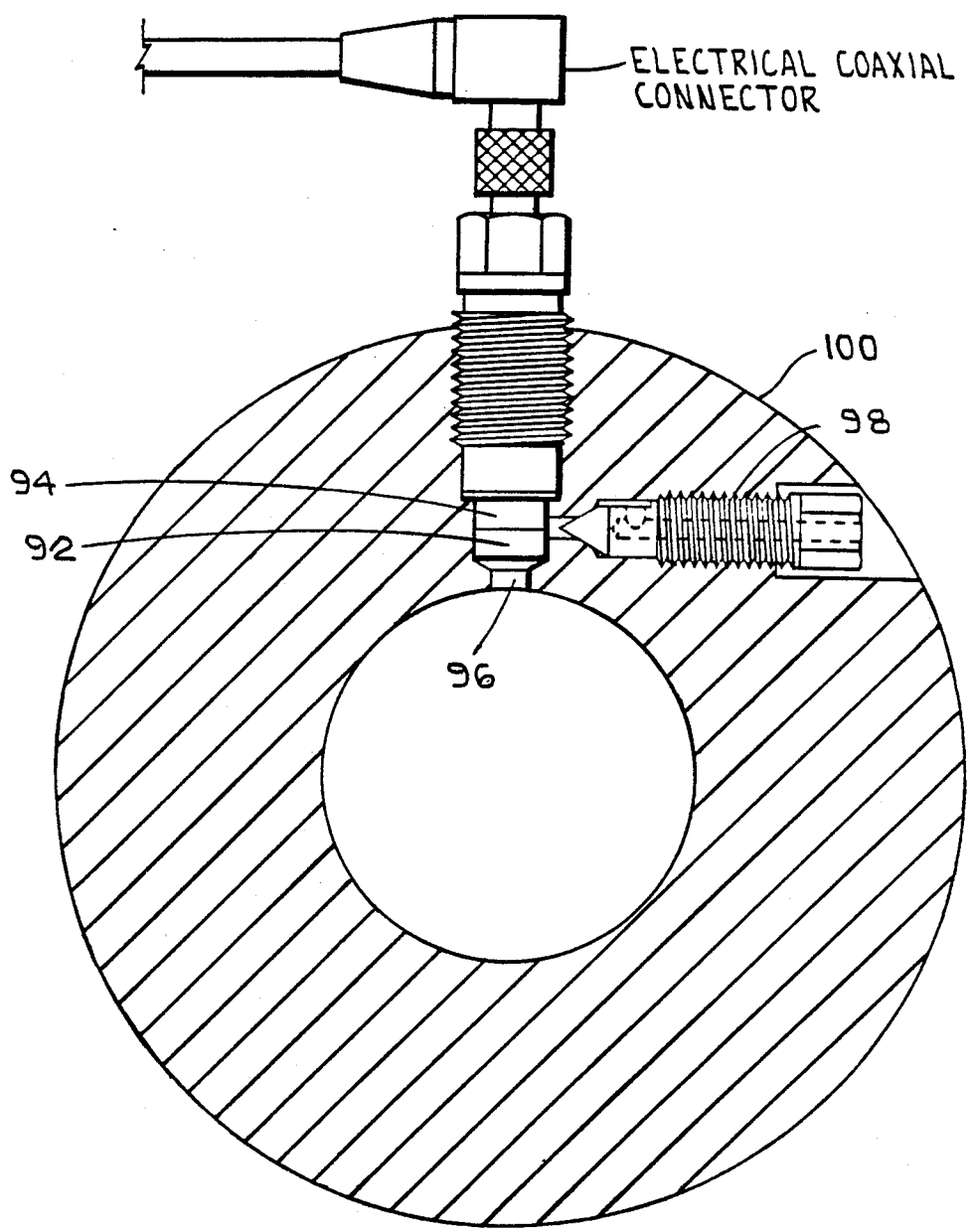
FIG. 6 shows the FIG. 3b pressure transducer embodiment mounted in the sidewall of a 30MM gun.

Referring to FIG. 6 there is shown the pressure transducer which is identified in the art as model E30MA mounted in the sidewall of a 30MM gun. The pressure generated by the burning propellant enters the cavity 92 containing the pressure sensing element or crystal assembly 94 through the pressure port 94 which is opened into the weapon chamber. The pressure seal is simply a metal washer used to prevent gas leakage. The needle valve 98 is used to inject a high temperature grease into the cavity 92 for thermal protection of the pressure sensing element. On the larger gun tubes, the grease is injected from the inside of the chamber through the pressure port using a special grease gun adaptor. The needle valve technique of injecting the grease is covered in detail under the referenced U.S. Pat. No. 4,621,519 which describes the model T8 ballistics pressure transducer.

While I have described and shown the particular embodiments of my invention, it will be understood that many modifications may be made without departing from the spirit thereof, and I comtemplate by the appended claims to cover any such modifications as fall within the true spirit and scope of my invention.

I claim:

1. A miniaturized pressure transducer for measuring pressure characteristic and mounted within the thin sidewall of a gun weapon tube during the propellant ignition and burning process of ordnance projectiles comprising:

a pressure transducer body having a bored cavity mounted within the sidewall of the gun weapon tube;

pressure sensing means located within said bored cavity and continuously sensing pressure within the gun weapon tube;

said transducer body and said pressure sensing means being operatively aligned about a common center line;

said pressure sensing means being attached to said transducer body by an insulating epoxy and by a retainer cap which serves as an abrasion and thermal barrier;

insulator means including an insulating washer and insulating wire conductors located within said bored cavity for electrically insulating said pressure sensing means from the gun weapon ground;

a coaxial connector fixedly attached to said transducer body and electrically insulated from said transducer body;

a crystal base element inserted between said transducer body and said pressure sensing means, said crystal base element making said pressure sensing means readily structurally detachable as in insert member in the gun weapon tube; and a pressure chamber surrounding said pressure sensing means, said pressure chamber having an opening into the interior section of the gun weapon tube;

a pressure seal to partially seal said opening of the pressure chamber;

and means for injecting high temperature grease into said pressure chamber.

2. The miniaturized pressure transducer of claim 1 wherein said pressure sensing means is a tourmaline piezoelectric crystal disc.

3. The miniaturized pressure transducer of claim 1 wherein metal discs are attached to positive and negative faces of said crystal disc.

* * * * *